May 28, 1968  F. BESTENREINER  3,385,187
PHOTOGRAPHIC CAMERA
Filed Aug. 24, 1965
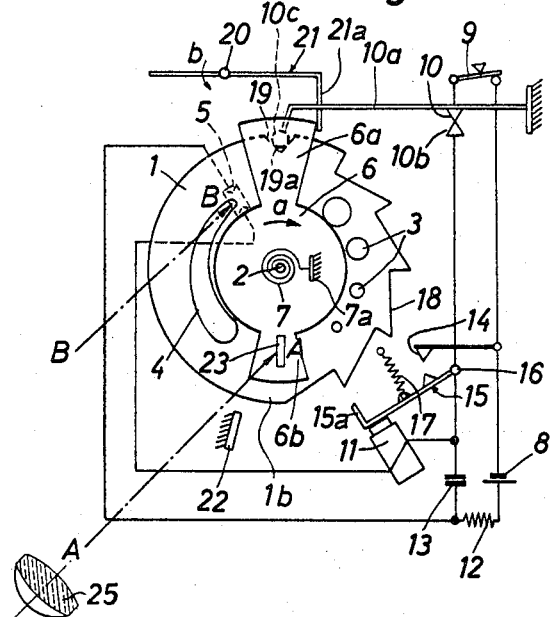
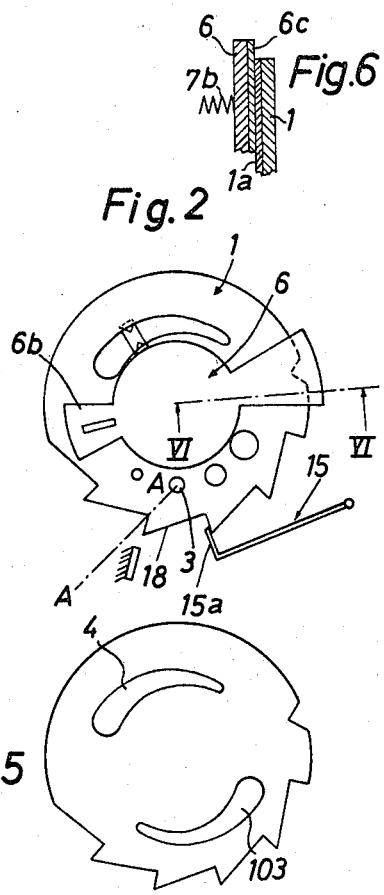
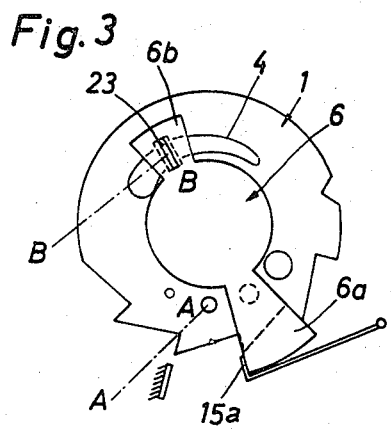
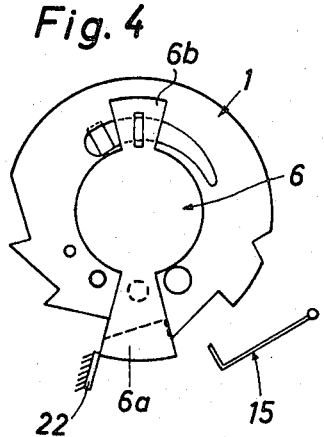
INVENTOR.
FRITZ BESTENREINER
BY Michael J. Striker 3,385,187
PHOTOGRAPHIC CAMERA
Fritz Bestenreiner, Grunwald, near Munich, Germany, assignor to Agfa-Gevaert Aktiengesellschaft, Leverkusen, Germany
Filed Aug. 24, 1965, Ser. No. 482,041
Claims priority, application Germany, Aug. 27, 1964, A 46,945
20 Claims. (Cl. 95—10)

The present invention relates to photographic cameras in general, and more particularly to improvements in an automatic exposure control assembly for use in photographic cameras. Still more particularly, the invention relates to improvements in an exposure control assembly which automatically selects not only the size of the diaphragm aperture but also the exposure time and wherein such selection is made by means of an electric delay circuit.

It is an important object of the present invention to provide a very simple, compact and inexpensive automatic exposure control assembly which can be installed in many types of existing cameras without necessitating substantial alterations in the construction of such apparatus.

Another object of the invention is to provide an automatic exposure control assembly whose delay circuit includes a single electromagnet.

A further object of the invention is to provide an exposure control assembly which can be set for any desired combination of diaphragm aperture sizes and exposure times.

An additional object of the instant invention is to provide an assembly of the above outlined characteristics wherein the admission of light to the photosensitive element of the delay circuit may be controlled by the diaphragm member alone or by the diaphragm member and by the shutter member.

A concomitant object of the invention is to provide a novel delay circuit for use in an automatic exposure control assembly.

A further object of the invention is to provide a novel system of switches for use in the improved delay circuit.

Another object of the invention is to provide a delay circuit wherein the energization or deenergization of a single relay suffices to effect proper selection of exposure time and the size of the diaphragm opening in a fully automatic way.

Briefly stated, one feature of my invention resides in the provision of a photographic camera, particularly a still camera, which comprises an automatic exposure control assembly including a diaphragm member having apertures of different size, a normally uncocked shutter member mounted between the lens and the diaphragm member and arranged to prevent passage of light from the lens to the apertures when allowed to assume its uncocked position, means for cocking the shutter member, motion transmitting means normally coupling the two members so that, when released for movement from cocked position toward uncocked position, the shutter member entrains the diaphragm member and places the apertures seriatim into registry with the lens, and an electric delay circuit including a relay having a blocking portion or armature movable to and from blocking engagement with the two members and being arranged to release the members in response to energization of the relay. The delay circuit further includes means for energizing the relay in cocked position of the shutter member so as to permit movement toward uncocked position, aperture selecting means for deenergizing the relay in response to movement of the shutter member from cocked position and with a first delay which is a function of the intensity of light coming from a viewed subject so that the diaphragm member is blocked when the lens registers with that aperture whose size is designed for transmission of such light, and exposure time selecting means for reenergizing the relay in response to blocking of the diaphragm member and with a second delay which is again a function of the intensity of light coming from the viewed subject so that at least the shutter member can return to uncocked position to prevent further transmission of light through the selected aperture.

The novel features which are considered as characteristic of the invention are set forth in particular in the appended claims. The improved automatic exposure control assembly itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic front elevational view of an assembly which embodies one form of my invention, the shutter member being shown in cocked position;

FIG. 2 illustrates the shutter member and the diaphragm member in an intermediate position in which the relay is deenergized and its armature blocks the diaphragm member;

FIG. 3 shows the structure of FIG. 2 but with the shutter member in a different position in which this member is blocked by the armature;

FIG. 4 shows the structure of FIG. 2 or 3 but with both members in uncocked position;

FIG. 5 illustrates a modified diaphragm member; and

FIG. 6 is a fragmentary section substantially as seen in the direction of arrows from the line VI—VI of FIG. 2 and illustrates a friction coupling which transmits motion from the shutter member to the diaphragm member.

Referring to FIG. 1, there is shown a portion of a still camera which comprises an automatic exposure control assembly including a flat plate-like diaphragm member or setting member 1 which is rotatable about the fixed axis of a shaft 2. The diaphragm member 1 is provided with a set of apertures 3 whose centers are located on the periphery of a circle having its center located on the axis of the shaft 2. The size of each aperture 3 is different and their centers are equidistant from each other. Each of the apertures 3 may be moved into such angular position that it permits passage of a first light ray or bundle which passes through the lens 25 and along the optical axis A—A. The diaphragm member 1 is further provided with an arcuate sickle-shaped or horn-shaped opening 4 which is located substantially diametrically opposite the set of apertures 3 and serves to admit a second light ray or bundle B—B impinging against the photosensitive surface of an element 5, preferably a photoelectric resistor, forming part of a delay circuit which will be described later. It is clear that the set of apertures 3 may be replaced by a second sickle-shaped or horn-shaped opening 103 (see FIG. 5) similar to the opening 4 or that the diaphragm member 1 may be provided with a single sickle-shaped or horn-shaped opening which replaces the opening 4 and the apertures 3 of FIG. 1 or the aperture 103 of FIG. 5. In such construction, the adjoining portions of the sickle-shaped opening constitute apertures of different size.

The shaft 2 carries a plate-like shutter member 6 having two radially outwardly projecting extensions or wings 6a, 6b which are located diametrically opposite each other. This shutter member 6 is biased by a helical torsion spring 7 one end of which is fixed to a stationary part 7a of the camera housing. The adjacent surfaces of the diaphragm member 1 and shutter blade 6 are coated with motion transmitting liners 1a, 6c of friction generating material (see FIG. 6) and the two members 1, 6 are biased against each other by one or more springs 7b to make sure that the diaphragm member 1 is normally coupled with and is compelled to share angular movements of the shutter member 1.

The exposure control assembly further comprises the aforementioned electric delay circuit which enables it to select a desired combination of exposure values in dependency on the intensity of light coming from a viewed scene or subject. The delay circuit includes a source of electrical energy, for example, a battery 8, a main switch 9, which is connected in series with the battery, a first control switch 10 which constitutes a means for selecting an aperture 3 of optimum size for a given light intensity and is connected in series with the main switch, a relay 11 connected in series with the battery 8, and a resistor 12 also connected in series with the battery. A capacitor 13 is connected in parallel with the photosensitive element 5 and relay 11, and a second control switch 14 is connected in parallel with the switches 9 and 10. This second control switch 14 serves as a means for selecting the exposure time.

The relay 11 comprises an armature here shown as a rockable blocking lever 15 which carries the movable contact of the second control switch 14. The blocking lever 15 is pivotable on a pin 16 and is biased by a spring 17 which tends to rock it in a clockwise direction, as viewed in FIG. 1, so that the bent-over pallet 15a of the lever 15 tends to engage one of several teeth forming part of a serrated or toothed portion 18 on the periphery of the diaphragm member 1. Each tooth of the serrated portion 18 corresponds to one of the apertures 3. When the relay 11 is sufficiently energized, it overcomes the bias of the spring 17 and attracts the blocking lever 15 so that the pallet 15a is disengaged from the serrated portion 18. The second control switch 14 is closed when the pallet 15a is free to follow the bias of the spring 17 and engages a tooth on the periphery of the setting member 1, i.e., the control switch 14 closes in automatic response to deenergization of the relay 11.

The first control switch 10 may be opened or closed by a cam 19 on the periphery of the diaphragm member 1. The movable contact of the switch 10 is mounted on a resilient arm 10a whose free end carries a follower 10c arranged to track the face of the cam 19. The control switch 10 is closed and energizes the relay 11 when the follower 10c extends into a recess or notch 19a in the face of the cam 19, i.e., when the shutter member 6 assumes its cocked position.

The main switch 9 may be closed by hand prior to making an exposure. However, it is also possible to close the main switch 9 in response to operation of the cocking mechanism which is used to cock the shutter member 6 against the bias of the spring 7.

The camera further comprises a release lever 21 which is pivotable on a pin 20 and whose end portion 21a engages the wing 6a when the shutter member 6 has been rotated against the bias of the spring 7 and assumes the cocked position of FIG. 1. The end portion 21a then prevents rotation of the shutter member 6 in a clockwise direction, as viewed in FIG. 1 (see the arrow a). A fixed stop 2 is located in the path of the wing 6a and serves to arrest the shutter member 6 in uncocked position. In such uncocked position, the wing 6a of the shutter member 6 prevents transmission of light from the lens 25 to any of the apertures 3. It will be seen that the shutter member 6 is mounted between the lens 25 and the diaphragm member 1. The wing 6a is longer than the wing 6b.

The wing 6b is provided with a window or slot 23 which can move in front of the sickle-shaped opening 4 when the shutter member 6 rotates with reference to the diaphragm member 1.

The operation of the automatic exposure control assembly shown in FIG. 1 is as follows:

In the position as actually illustrated in FIG. 1, the shutter member 6 is fully cocked and its longer wing 6a is held by the end portion 21a of the release lever 21. In order to make an exposure, the operator rocks the release lever 21 in a counterclockwise direction (see the arrow b) so that the end portion 21a is withdrawn from the path of the wing 6a and the spring 7 is free to rotate the shutter member 6 in the direction of the arrow a. The spring 7b and the liners 1a, 6c (FIG. 6) cause the diaphragm member 1 to rotate with the member 6 whereby the follower 10c of the movable arm 10a moves out of the notch 19a to open the first control switch 10 by shifting the movable contact on the arm 10a away from the fixed contact 10b. The delay circuit is now open because the control switches 10 and 14 are open. The main switch 9 remains closed. However, a current flows in the circuit of the capacitor 13 which was charged prior to opening of the first control switch 10 by the cam 19. Such current maintains the relay 11 in energized condition by flowing in the permanently closed circuit including the capacitor 13, the relay 11 and the photosensitive resistor 5 whereby the relay continues to attract the blocking lever 15 against the bias of the spring 17 and the diaphragm member 1 remains free to rotate with the shutter member 6 under the bias of the spring 7.

After a certain delay which is determined by the resistance of the resistor 5, the strength of the current in the circuit including the parts 5, 11 and 13 drops to such a value that the relay 11 cannot oppose the bias of the spring 17 whereby the pallet 15a of the blocking lever 15 engages the nearest tooth of the serrated portion 18 and holds the diaphragm member 1 against further rotation with the shutter member 6 (see FIG. 2). The resistance of the photosensitive resistor 5 depends on the intensity of incoming light so that the angular position of the diaphragm member 1 at the time when its serrated portion 18 is engaged and arrested by the blocking lever 15 is a function of such intensity. The corresponding aperture 3 then allows the light to pass through the diaphragm member 1 and to reach the unexposed frame of the film, not shown. The wing 6b rotates with the shutter member 6 and assumes the position of FIG. 2 when the diaphragm member 1 is arrested by the blocking lever 15. In the illustrated embodiment, the intensity of the light ray or bundle B—B which reaches the photosensitive resistor 5 is that the diaphragm member 1 is arrested in an angular position in which the next-to-the-smallest aperture 3 is held in registry with the lens 25, the size of this aperture being designed for transmission of such light.

The shutter member 6 continues to rotate in a clockwise direction (arrow a) because the bias of the spring 7 is strong enough to overcome the bias of the spring 7b and the friction between the liners 1a and 6c. This moves the longer wing 6a into engagement with the pallet 15a (see FIG. 3) whereby the pallet may but need not disengaged from the serrated portion 18 because the member 6 is frictionally coupled to the member 1 and the latter cannot rotate independently of the member 6. FIG. 3 shows that the wing 6a still allows light rays passing through the lens 25 to penetrate through the selected aperture 3 and to reach the film. However, the wing 6b is then located directly in front of the photosensitive resistor 5 so that the latter can receive only such light (B—B) which passes through the slot 23 and through the adjacent portion of the opening 4.

When the relay 11 is deenergized and the spring 17 moves the blocking lever 15 to the position of FIG. 2, the lever 15 closes the second control switch 14 to again complete the circuit of and to reenergize the relay. However, the delay with which the relay 11 is sufficiently reenergized to retract the lever 15 again depends on the resistance of the photosensitive resistor 5.

The resistance of the resistor 5 is now different than at the time (see FIG. 1) when the resistor 5 was exposed to light passing directly through the opening 4 because, in the position of FIG. 3, the slot 23 in the wing 6b determines the amount of light (B—B) which can reach the resistor 5. Thus, the exposure time will be dependent on the intensity of light and also on the size of the diaphragm aperture, namely, on the size of that aperture 3 which is in registry with the lens 25 at the time when the diaphragm member 1 is engaged and held by the blocking lever 15. Such construction saves an additional switch which is of advantage because the selection of the exposure time as a function of the size of the diaphragm opening must be completed within a very short interval of time.

As soon as the relay 11 is reenergized subsequent to closing of the second control switch 14 (with a delay which is determined by the resistance of the resistor 5 as a function of the intensity of light entering through the slot 23 and opening 4), the blocking lever 15 is moved to the position shown in FIG. 4 and the spring 7 is free to move the longer wing 6a into actual abutment with the fixed stop 22. The diaphragm member 6 follows such movement due to frictional engagement between the liners 1a and 6c.

The shaft 2 may constitute a component of the cocking means for the shutter member 6 and is rotated in a counterclockwise direction, as viewed in FIG. 1, to return the member 6 to the cocked position of FIG. 1 in which the follower 10c reenters the notch 19a to close the control switch 10. It will be seen that the control switch 14 closes only when the control switch 10 is open and then completes the circuit of the relay 11 at the time when the pallet 15a of the blocking lever 15 engages the serrated portion 18. When the members 1 and 6 are cocked, the opaque portion 1b of the diaphragm member 1 is held in registry with the lens 25. Thus, this opaque portion actually performs the function of a shutter to prevent uncontrolled exposure of film in cocked position of the shutter member.

Since the members 1 and 6 are normally coupled for rotation to and from uncocked position, a single spring 7 suffices to bias both members to uncocked position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a camera, an automatic exposure control assembly comprising a diaphragm member having apertures of different size; a normally uncocked shutter member arranged to prevent passage of light from the lens to said apertures in uncocked position thereof; means for cocking said shutter member; means for normally coupling said members so that, when released for movement toward uncocked position, said shutter member places said apertures seriatim into registry with the lens; and an electric delay circuit including a relay having a blocking portion arranged to release said members in response to energization thereof, means for energizing said relay in cocked position of said shutter member, aperture selecting means for deenergizing said relay in response to movement of said members from cocked position and with a first delay which is a function of the intensity of light coming from a subject so that said diaphragm member is blocked when the lens registers with that aperture whose size is designed for transmission of such light, and exposure time selecting means for reenergizing said relay in response to blocking of said diaphragm member and with a second delay which is again a function of said intensity so that at least said shutter member can return to uncocked position.

2. In a camera, an automatic exposure control assembly comprising a diaphragm member having apertures of different size; a normally uncocked shutter member arranged to prevent passage of light from the lens to said apertures in uncocked position thereof; means for normally coupling said members so that, when moving from cocked toward uncocked position, said shutter member places said apertures seriatim into registry with the lens; and an electric delay circuit including a relay having an energized condition and a deenergized condition and comprising a blocking portion arranged to release said members in response to a change from the one to the other of said conditions, means for placing said relay into said other condition in cocked position of said shutter member, aperture selecting means for placing said relay into said one condition in response to movement of said members from cocked position and with a first delay which is a function of the intensity of light coming from a subject so that said diaphragm member is blocked when the lens registers with that aperture whose size is designed for transmission of such light, and exposure time selecting means for again placing the relay into said other condition in response to blocking of said diaphragm member and with a second delay which is again a function of said intensity so that at least said shutter member can return to uncocked position.

3. In a photographic camera, particularly in a still camera having a lens, an automatic exposure control assembly comprising a diaphragm member having apertures of different size; a normally uncocked shutter member disposed between the lens and said diaphragm member and having a portion arranged to prevent the passage of light from the lens to said apertures in uncocked position thereof; means for cocking said shutter member; motion transmitting means for normally coupling said members so that, when released for movement from cocked position toward uncocked position, said shutter member places said apertures seriatim into registry with the lens; and an electric delay circuit including a relay having a blocking portion movable to and from blocking engagement with said members and arranged to unblock said members in response to deenergization of said relay, means for energizing said relay in cocked position of said shutter member to permit movement of said members from cocked position, aperture selecting means for deenergizing said relay in response to movement of said members from cocked position and with a first delay which is a function of the intensity of light coming from a viewed subject so that said diaphragm member is blocked when the lens registers with that aperture whose size is designed for transmission of light of such intensity, and exposure time selecting means for reenergizing said relay in response to blocking of said diaphragm member and with a second delay which is again a function of said intensity so that at least said shutter member can return to uncocked position to prevent further transmission of light through the selected aperture.

4. In a camera, an automatic exposure control assembly comprising a diaphragm member having apertures of different size; a normally uncocked shutter member arranged to prevent passage of light from the lens to said apertures in uncocked position thereof; means for cocking said shutter member; means for normally coupling said members so that, when released for movement toward uncocked position, said shutter member places said apertures seriatim into registry with the lens; and an electric delay circuit including a relay having a blocking portion arranged to release said members in response to energization thereof, a photosensitive resistor connected in series with said relay and located in the path of light coming from the subject so that its resistance to flow of current through said relay is a function of the intensity of such light, means for energizing said relay in cocked position of said shutter member, aperture selecting means for deenergizing said relay in response to movement of said members from cocked position and with a first delay which is a function of the resistance of said resistor so that said diaphragm member is blocked when the lens registers with that aperture whose size is designed for transmission of such light, and exposure time selecting means for reenergizing said relay in response to blocking of said diaphragm member and with a second delay which is again a function of the resistance of said resistor so that at least said shutter member can return to uncocked position.

5. In a camera having a lens, an automatic exposure control assembly comprising a plate-like rotary diaphragm member having apertures of different size and an opening; a normally uncocked rotary shutter member disposed between said diaphragm member and the lens and arranged to prevent the passage of light from the lens to said apertures in uncocked position thereof; means for cocking said shutter member; means for normally coupling said members so that, when rotating from cocked position toward uncocked position, said shutter member places said apertures seriatim into registry with the lens; and an electric delay circuit including a relay having a blocking portion arranged to release said members in response to energization thereof, a photosensitive element connected in series with said relay and located in the path of light coming from the viewed subject and passing through the opening of said diaphragm member so that the resistance of said element to the flow of a current through said relay is a function of the intensity of such light, means for energizing said relay in cocked position of said shutter member, aperture selecting means for deenergizing said relay in response to rotation of said members from cocked position and with a first delay which is a function of the resistance of said photosensitive element so that said diaphragm member is blocked by said blocking portion when the lens registers with that aperture whose size is designed for transmission of such light, and exposure time selecting means for reenergizing said relay in response to blocking of said diaphragm member and with a second delay which is again a function of the resistance of said photosensitive element so that at least said shutter member can rotate back to uncocked position.

6. In a camera, an automatic exposure control assembly comprising a diaphragm member having apertures of different size; a normally uncocked shutter member arranged to prevent passage of light from the lens to said apertures in uncocked position threof; means for cocking said shutter member; means for normally coupling said members so that, when released for movement toward uncocked position, said shutter member places said apertures seriatim into registry with the lens, said diaphragm member having an opaque portion in registry with the lens in uncocked position of said shutter member; and an electric delay circuit including a relay having a blocking portion arranged to release said members in response to energization thereof, means for energizing said relay in cocked position of said shutter member, aperture selecting means for deenergizing said relay in response to movement of said members from cocked position and with a first delay which is a function of the intensity of light coming from a subject so that said diaphragm member is blocked when the lens registers with that aperture whose size is designed for transmission of such light, and exposure time selecting means for reenergizing said relay in response to blocking of said diaphragm member and with a second delay which is again a function of said intensity so that at least said shutter member can return to uncocked position.

7. In a camera, an automatic exposure control assembly comprising a diaphragm member having apertures of different size; a shutter member arranged to prevent passage of light from the lens to said apertures in uncocked position thereof; means for cocking said shutter member; resilient means for biasing said shutter member to uncocked position; a friction coupling normally connecting said members so that, when released for a movement toward uncocked position, said shutter member places said apertures seriatim into registry with the lens; and an electric delay circuit including a relay having a blocking portion arranged to release said members in response to energization thereof, means for energizing said relay in cocking position of said shutter member, aperture selecting means for deenergizing said relay in response to movement of said members from cocked position and with a first delay which is a function of the intensity of light coming from a subject so that said diaphragm member is blocked when the lens registers with that aperture whose size is designed for transmission of such light, and exposure time selecting means for reenergizing said relay in response to blocking of said diaphragm member and with a second delay which is again a function of said intensity so that at least said shutter member can return to uncocked position.

8. In a camera having a lens, an automatic exposure control assembly comprising a plate-like rotary diaphragm member having apertures of different size and an opening; a rotary shutter member disposed between said diaphragm member and the lens, said shutter member comprising a first extension arranged to prevent the passage of light to said apertures in uncocked position of the shutter member and a second extension provided with a slot which travels in front of said opening when the shutter member rotates with reference to said diaphragm member; resilient means for biasing said shutter member to uncocked position; means for cocking said shutter member; a friction coupling normally connecting said members so that, when rotating from cocked position toward uncocked position, said shutter member places said apertures seriatim into registry with the lens; and an electric delay circuit including a relay having a blocking portion arranged to release said members in response to energization thereof; a photosensitive resistor connected in series with said relay and located in the path of light coming from the viewed subject and passing through the opening of said diaphragm member so that the resistance of said element to the flow of a current through said relay is a function of the intensity of such light, means for energizing said relay in cocked position of said shutter member, aperture selecting means for deenergizing said relay in response to rotation of said members from cocked position and with a first delay which is a function of the resistance of said photosensitive resistor so that said diaphragm member is blocked by said blocking portion when the lens registers with that aperture whose size is designed for transmission of such light, and exposure time selecting means for reenergizing said relay in response to blocking of said diaphragm member and with a second delay which is again a function of the resistance of said photosensitive resistor so that at least said shutter member can rotate back to uncocked position, said slot being located in the path of light reaching said resistor when the shutter member is engaged and held by said blocking portion so that the resistor receives only such light which can pass through said slot.

9. In a camera, an automatic exposure control assembly comprising a rotary diaphragm member having apertures of different size; a rotary shutter member coaxial with said diaphragm member, said shutter member being arranged to prevent passage of light from the lens to said apertures in uncocked position thereof; means for cocking said shutter member; means for normally coupling said members so that, when released for rotation toward uncocked position, said shutter member places said apertures seriatim into registry with the lens, said coupling means comprising abutting friction generating liners provided on said members; and an electric delay circuit including a relay having a blocking portion arranged to release said members in response to energization thereof, means for energizing said relay in cocked position of said shutter member, aperture selecting means for deenergizing said relay in response to rotation of said members from cocked position and with a first delay which is a function of the intensity of light coming from a subject so that said diaphragm member is blocked when the lens register with that aperture whose size is designed for transmission of such light, and exposure time selecting means, for re-energizing said relay in response to blocking of said diaphragm member and with a second delay which is again a function of said intensity so that at least said shutter member can return to uncocked position.

10. In a camera having a lens, an automatic exposure control assembly comprising a rotary diaphragm member having apertures of different size and including a cam; a rotary shutter member; means for cocking said shutter member; means for biasing said shutter member to uncocked position; release means movable into and out of engagement with and arranged to normally hold the shutter member in cocked position; means for normally coupling said members so that, when disengaged from said release means for rotation toward uncocked position, said shutter member entrains said diaphragm member to place said apertures seriatim into registry with the lens; a serrated portion having a plurality of teeth provided on said diaphragm member, one for each of said apertures; a portion provided on said shutter member for preventing the passage of light from the lens to said apertures in uncocked position of said shutter member; and an electric delay circuit including a relay having an armature arranged to move away from said members when the relay is energized, means for moving said armature into the path of said shutter portion and said teeth in response to deenergization of said relay, a first control switch connected in series with said relay and being closed in cocked position of said members, said cam being arranged to open said first control switch on rotation of said members from cocked position to open said circuit and to deenergize said relay with a first delay which is a function of the intensity of light coming from a subject so that said armature engages a selected tooth of said serrated portion to block the diaphragm member when the lens registers with that aperture whose size is designed for transmission of such light, and a second control switch connected in parallel with said first control switch and arranged to complete said circuit when said first control switch is open and in response to engagement of said armature with said serrated portion to thus reenergize said relay with a second delay which is again a function of said intensity so that said armature allows said members to return to uncocked position.

11. An assembly as set forth in claim 10, wherein said apertures are circular apertures having different diameters.

12. An assembly as set forth in claim 10, wherein said apertures together form a sickle-shaped aperture.

13. An assembly as set forth in claim 10, wherein said circuit further comprises a main switch connected in series with said first control switch and in parallel with said second control switch.

14. An assembly as set forth in claim 13, wherein said main switch is arranged to close in response to cocking of said shutter member.

15. An assembly as set forth in claim 10, wherein said circuit further comprises a capacitor and a photoelectric resistor both connected in series with said relay and in parallel with said first control switch, said resistor being located in the path of light coming from a viewed subject so that its resistance is a function of the intensity of such light.

16. An assembly as set forth in claim 15, wherein said diaphragm member is provided with an opening which admits light to said resistor.

17. An assembly as set forth in claim 16, wherein said shutter member is provided with a slot for admitting light to said opening and to said resistor when said armature blocks said shutter portion in response to deenergization of said relay.

18. An assembly as set forth in claim 10, further comprising fixed stop means for arresting said shutter member in uncocked position.

19. An assembly as set forth in claim 10, wherein said cocking means comprises a shaft fixed to said shutter member and said biasing means comprises a torsion spring operatively connected with said shaft.

20. An assembly as set forth in claim 10, wherein said shutter portion is blocked by said armature subsequent to engagement of the armature with said selected tooth so that the shutter member rotates with reference to said diaphragm member during a part of its movement to uncocked position.

References Cited

UNITED STATES PATENTS

| | | | |
|---|---|---|---|
| 3,000,281 | 9/1961 | Rentschler | 95—10 |
| 3,134,311 | 5/1964 | Starp | 95—10 |

JOHN M. HORAN, *Primary Examiner.*

NORTON ANSHER, *Examiner.*

R. A. SCHROEDER, *Assistant Examiner.*